United States Patent
Brandenburg et al.

(10) Patent No.: US 12,160,568 B2
(45) Date of Patent: *Dec. 3, 2024

(54) APPARATUS FOR SELECTING AN INTRA-PREDICTION MODE FOR PADDING

(71) Applicant: FRAUNHOFER-GESELLSCHAFT ZUR FÖRDERUNG DER ANGEWANDTEN FORSCHUNG E.V., Munich (DE)

(72) Inventors: Jens Brandenburg, Berlin (DE); Tobias Hinz, Berlin (DE); Adam Wieckowski, Berlin (DE); Jackie Ma, Berlin (DE); Valeri George, Berlin (DE); Christian Lehmann, Berlin (DE); Heiko Schwarz, Berlin (DE); Detlev Marpe, Berlin (DE); Thomas Wiegand, Berlin (DE); Robert Skupin, Berlin (DE); Yago Sánchez De La Fuente, Berlin (DE); Thomas Schierl, Berlin (DE)

(73) Assignee: Fraunhofer-Gesellschaft zur Förderung der angewandten Forschung, e.V., Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/195,362

(22) Filed: May 9, 2023

(65) Prior Publication Data
US 2023/0276047 A1 Aug. 31, 2023

Related U.S. Application Data

(63) Continuation of application No. 17/568,955, filed on Jan. 5, 2022, now Pat. No. 11,683,485, which is a
(Continued)

(30) Foreign Application Priority Data
Mar. 29, 2018 (EP) .................................. 18165221

(51) Int. Cl.
H04N 7/12 (2006.01)
H04N 19/107 (2014.01)
(Continued)

(52) U.S. Cl.
CPC ........... *H04N 19/107* (2014.11); *H04N 19/11* (2014.11); *H04N 19/172* (2014.11);
(Continued)

(58) Field of Classification Search
CPC .... H04N 19/107; H04N 19/11; H04N 19/172; H04N 19/176; H04N 19/513;
(Continued)

(56) References Cited

U.S. PATENT DOCUMENTS

2012/0314767 A1* 12/2012 Wang .................. H04N 19/593
375/E7.243
2012/0328013 A1 12/2012 Budagavi et al.
(Continued)

FOREIGN PATENT DOCUMENTS

WO 2012173991 A1 12/2012
WO 2013052244 A1 4/2013
WO 2017162912 A1 9/2017

OTHER PUBLICATIONS

Albrecht, M., et al., "Description of SDR, HDR and 360 Degree Video Coding Technology Proposal by Franhofer HHI", 10th JVET Meeting: Oct. 4, 2018-Apr. 20, 2018; San Diego (The Joint Exploration Team of ISO/IEC JTC1/SC29/WG11 and ITU-T SG. 16); URL: http://phenix.int-evry.fr/jvet/, No. JVET-J0014-v4, XP030151173, Apr. 12, 2018.
(Continued)

Primary Examiner — Gims S Philippe
(74) Attorney, Agent, or Firm — Conley Rose, P.C.

(57) ABSTRACT

Video codec for supporting temporal inter-prediction, configured to perform padding of an area of a referenced portion
(Continued)

of a reference picture which extends beyond a border of the reference picture, which referenced portion is referenced by an inter predicted block of a current picture by selecting one of a plurality of intra-prediction modes, and padding the area using the selected intra-prediction mode.

11 Claims, 12 Drawing Sheets

Related U.S. Application Data continuation of application No. 17/036,884, filed on Sep. 29, 2020, now Pat. No. 11,233,989, which is a continuation of application No. PCT/EP2019/058044, filed on Mar. 29, 2019.

(51) Int. Cl.
  *H04N 19/11* (2014.01)
  *H04N 19/172* (2014.01)
  *H04N 19/176* (2014.01)
  *H04N 19/513* (2014.01)
  *H04N 19/563* (2014.01)
  *H04N 19/593* (2014.01)

(52) U.S. Cl.
  CPC ......... *H04N 19/176* (2014.11); *H04N 19/513* (2014.11); *H04N 19/563* (2014.11); *H04N 19/593* (2014.11)

(58) Field of Classification Search
  CPC .. H04N 19/563; H04N 19/593; H04N 19/597; H04N 19/13; H04N 19/70; H04N 19/105
  See application file for complete search history.

(56) References Cited

U.S. PATENT DOCUMENTS

| | | |
|---|---|---|
| 2014/0376631 A1 | 12/2014 | Sato |
| 2015/0256844 A1 | 9/2015 | Ikai et al. |
| 2017/0035373 A1 | 2/2017 | Davis |
| 2017/0347102 A1 | 11/2017 | Panusopone et al. |
| 2017/0353737 A1 | 12/2017 | Lin et al. |
| 2018/0359487 A1* | 12/2018 | Bang ................... H04N 19/91 |
| 2019/0215532 A1* | 7/2019 | He ...................... H04N 13/344 |
| 2020/0322601 A1* | 10/2020 | Ko ....................... H04N 19/70 |
| 2021/0014522 A1* | 1/2021 | Jung ................... H04N 19/137 |

OTHER PUBLICATIONS

Chen, J., et al., Algorithm Description of Joint Exploration Test Model 7 (JEM 7), JVET, doc. JVET-G1001, Jul. 2017.
ITU-T and ISO/IEC High Efficiency Video Coding, ITU-T Recommendation H.265 | ISO/IEC 23008 10 (HEVC), edition 1, 2013; edition 2, 2014.
Yuwen, He, et al., "Motion Compensated Prediction with Geometry Padding for 360 Video Coding", 2017 IEEE Visual Communications and Image Processing (VCIP), IEEE, XP033325766, Dec. 10, 2017, pp. 1-4.

* cited by examiner

| side | coordinates of used border pixels | top-left and bottom-right template area coordinates |
|---|---|---|
| top | $\{x_{left-most};0\}-\{x_{right-most};0\}$ | $\{x_{left-most}-1;1\}-\{x_{right-most}+1;3\}$ |
| right | $\{width-1;y_{top-most}\}-\{width-1;y_{bottom-most}\}$ | $\{width-3;y_{top-most}-1\}-\{width-2;y_{bottom-most}+1\}$ |
| bottom | $\{x_{left-most};height-1\}-\{x_{right-most};height-1\}$ | $\{x_{left-most}-1;height-3\}-\{x_{right-most}+1;height-2\}$ |
| left | $\{0;y_{top-most}\}-\{0;y_{bottom-most}\}$ | $\{1;y_{top-most}-1\}-\{3;y_{bottom-most}+1\}$ |

Fig. 9

APPARATUS FOR SELECTING AN INTRA-PREDICTION MODE FOR PADDING

CROSS-REFERENCES TO RELATED APPLICATIONS

This application is a continuation of copending U.S. patent application Ser. No. 17/568,955, filed Jan. 5, 2022, which in turn is a continuation of copending U.S. patent application Ser. No. 17/036,884, filed Sep. 29, 2020, which in turn is a continuation of copending International Application No. PCT/EP2019/058044, filed Mar. 29, 2019, which is incorporated herein by reference in its entirety, and additionally claims priority from European Application No. EP 18165221.5, filed Mar. 29, 2018, which is incorporated herein by reference in its entirety.

The application is concerned with video coding/decoding.

BACKGROUND OF THE INVENTION

Since H.261, all video coding standards, including the state of the art ITU T H.265 | MPEG H HEVC video coding standard (reference 1: ITU-T and ISO/IEC. High efficiency video coding. ITU-T Recommendation H.265 | ISO/IEC 23008(HEVC), edition 1, 2013; edition 2, 2014), rely on the basic concept of block-based hybrid video coding. Here the input signal for each color component is segmented into disjoint blocks, which are encoded using a hybrid video coding scheme, based on prediction, transform, quantization and entropy coding. Thus, one of the first steps in the encoding and decoding algorithm is the generation of the prediction signal for the current block, which is performed by either a spatial or a temporal prediction scheme. In case of temporal prediction, the prediction signal is derived from already processed frames, which are denoted as reference frames. For this purpose, a displacement vector specifies the offset of the prediction signal in the reference frame relative to the position of the current coded block. This temporal prediction scheme is also known as translational motion compensated prediction. In this meaning, the displacement vector is denoted as motion vector.

In order to allow motion vectors with a sub-pixel precision, the prediction signal is calculated using interpolation filters. Furthermore, the prediction signal can be composed by a superposition of multiple prediction signals, each specified by a different motion vector and/or a different reference frame. Independent of final calculation and composition of the prediction signal, the basic principle remains the same. The area of the referenced block within the reference frame is determined by position and size of the current coded block, displaced by an additional motion vector. In case interpolation filters are used, this area has to be expanded to each side in dependence on the number of used filter taps. The pixels within the area of the referenced block are then used to generate the temporal prediction signal for the current coded block. Usually, the area of the referenced block lies within the reconstructed reference frame. Nevertheless, the area of the referenced block may not completely overlap with the area of the reconstructed frame, which means part of the referenced pixel area may lie outside of the reference frame area.

In current video coding standards the basic approach to handle a referenced portion, i.e., referenced pixel area outside the reference picture, i.e., reference frame area is either to restrict the motion vectors or to extend the reference frame area. For example, in H.261 the motion vectors are restricted at the picture boundary, such that all pixels referenced are within the reference frame area, i.e., all samples of a sample portion of the reference picture which are located within the border of the reference frame. Alternatively, in H.264/H.265, a process called boundary padding is used to extend the already reconstructed reference frame as shown in FIG. 16. That is, the boundary pixels (border samples 110) are copied into the padded area (an area outside of the reference picture 101), which can be viewed as an intra-prediction of the border pixels perpendicular to the frame border 106. Here, at the edges of the reference frame, the edge pixels are additionally copied into the remaining area outside the reference frame 101 area, which lies next to the edge pixel as shown in FIG. 16.

Further, known approaches to boundary padding are advantageous when dealing with specific video content known as omnidirectional or 360° video which employs an omnidirectional projection to map the camera surrounding onto a rectangular video picture plane. One of the widely used formats for such content is based on the equirectangular projection (ERP). Omnidirectional content allows filling regions outside the picture boundaries with correct content as the correct content is by definition depicted elsewhere in the same picture. Any vertical picture boundary of ERP video content that depicts 360° horizontally can be padded by copying samples from the opposite vertical picture boundary. However, the horizontal picture boundary, especially in case the vertical viewing angle offers less than full coverage, exhibits different characteristics.

In FIG. 17, an exemplary ERP video frame with 360° horizontal coverage angle and less than 180° vertical coverage angle is shown, namely only 30° viewing angle downwards from the equator at 0°. While the optimal padding for any of the vertical picture boundaries consists of using samples from the opposing vertical picture side, the top and bottom horizontal picture boundaries, marked with dashed lines, rather exhibit the characteristics similar to a picture boundary of a typical rectangular video with limited field of view and therefore benefit from the herein described multi-mode boundary padding. One aspect of the present invention is therefore, to vary the padding mode per picture boundary, e.g. depending knowledge of content characteristics or as signaled in the bitstream.

In many cases, a simple perpendicular extension of the frame border pixels leads to a continuation, which does not approximate the current predicted block very well. By using different intra-prediction modes to extend the reference frame border, e.g. angular, DC or Planar prediction, etc., a better continuation might be achieved. Exemplary intra-prediction modes which can be used for the border extension are the intra-prediction modes from H.265 as described in Reference 1 or from the Joint Exploration Test Model (JEM) as described in Reference 2 (J. Chen, E. Alshina, G. J. Sullivan, J.-R. Ohm, J. Boyce, Algorithm Description of Joint Exploration Test Model 7 (JEM 7), JVET, doc. JVET-G1001, July 2017). Moreover, in a future embodiment of this method, also future intra-prediction modes can be used to extend the reference border. The mode of the spatial extension of the frame border depends on the characteristics of the current predicted block. Hence, from a set of multiple angular intra-prediction modes, a certain angular intra-prediction mode has to be chosen/selected to generate a prediction signal, which provides the best approximation of the current predicted block.

SUMMARY

An embodiment may have a video encoder for supporting temporal inter-prediction, configured to perform padding of an area of a referenced portion of a reference picture which extends or lies beyond a border of the reference picture, which referenced portion is referenced by an inter predicted block of a current picture by selecting one of a plurality of intra-prediction modes, and padding the area using the selected intra-prediction mode.

Another embodiment may have a video decoder for supporting temporal inter-prediction, configured to perform padding of an area of a referenced portion of a reference picture which extends or lies beyond a border of the reference picture, which referenced portion is referenced by an inter predicted block of a current picture by selecting one of a plurality of intra-prediction modes, and padding the area using the selected intra-prediction mode.

According to another embodiment, a method for encoding for supporting temporal inter-prediction may have the step of performing padding of an area of a referenced portion of a reference picture which extends beyond a border of the reference picture, which referenced portion is referenced by an inter predicted block of a current picture by selecting one of a plurality of intra-prediction modes, and padding the area using the selected intra-prediction mode.

According to another embodiment, a method for decoding for supporting temporal inter-prediction may have the step of performing padding of an area of a referenced portion of a reference picture which extends beyond a border of the reference picture, which referenced portion is referenced by an inter predicted block of a current picture by selecting one of a plurality of angular intra-prediction modes, and padding the area using the selected angular intra-prediction mode.

Another embodiment may have a non-transitory digital storage medium having a computer program stored thereon to perform any of the inventive methods when said computer program is run by a computer.

Another embodiment may have a data stream generated by any of the inventive methods.

It is basic idea underlying the present application that the quality improvement of temporal inter-prediction is achieved by selecting the most appropriate intra-prediction mode for padding. This might be selection of an angular intra prediction mode out of a plurality of such intra prediction modes based on the characteristic of the current predicted block.

In accordance with an embodiment, an angular intra-prediction mode to be used for padding is selected based on an evaluation of an area of the reference picture at a portion of the border of the reference picture where the referenced portion crosses the border. The evaluation is performed by, for each of at least a subset of the plurality of angular intra-prediction modes, filling, based on border samples of the reference picture at the portion of the border, along a direction opposite to a filling direction associated with the respective angular intra-prediction mode, a probe area located farther away from the border than the border sample to obtain a probe filling; and comparing the probe filling with a reconstructed filling of the probe area to measure a similarity between them. Hence, the selecting is performed based on the characteristic of the current predicted block and therefore, it is possible to provide the best approximation of the current predicted block and improve the prediction quality.

In accordance with embodiments of the present application, an angular intra-prediction mode to be used for padding is selected based on a prediction result of the area of the referenced portion which is outside of the reference picture. The referenced portion is referenced by an inter-prediction block of a current picture. Therefore, the angular intra-prediction mode is selected depending on the characteristic of the area and therefore, it is possible to select the most appropriate angular intra-prediction mode for padding. In addition, a plurality of used angular intra-prediction modes for predicting the area could be signaled as a subset of supported angular intra-prediction modes supported by the codec for an intra-predicted block.

BRIEF DESCRIPTION OF THE DRAWINGS

Embodiments of the present invention will be detailed subsequently referring to the appended drawings, in which:

FIG. 9 shows a sample table of derivation of the probe area coordinate in accordance with an embodiment of the present application;

DETAILED DESCRIPTION OF THE INVENTION

The following description of the figures starts with a presentation of a description of video encoder and video decoder of a block-based predictive codec for coding pictures of a video in order to form an example for a coding framework into which embodiments for a composed prediction codec may be built in. The video encoder and video decoder are described with respect to FIGS. 1 to 3. Thereinafter the description of embodiments of the composed prediction concept of the present application are presented along with a description as to how such concepts could be built into the video encoder and decoder of FIGS. 1 and 2, respectively, although the embodiments described with the subsequent FIG. 4 and following, may also be used to form video encoder and video decoders not operating according to the coding framework underlying the video encoder and video decoder of FIGS. 1 and 2.

Figure 1:
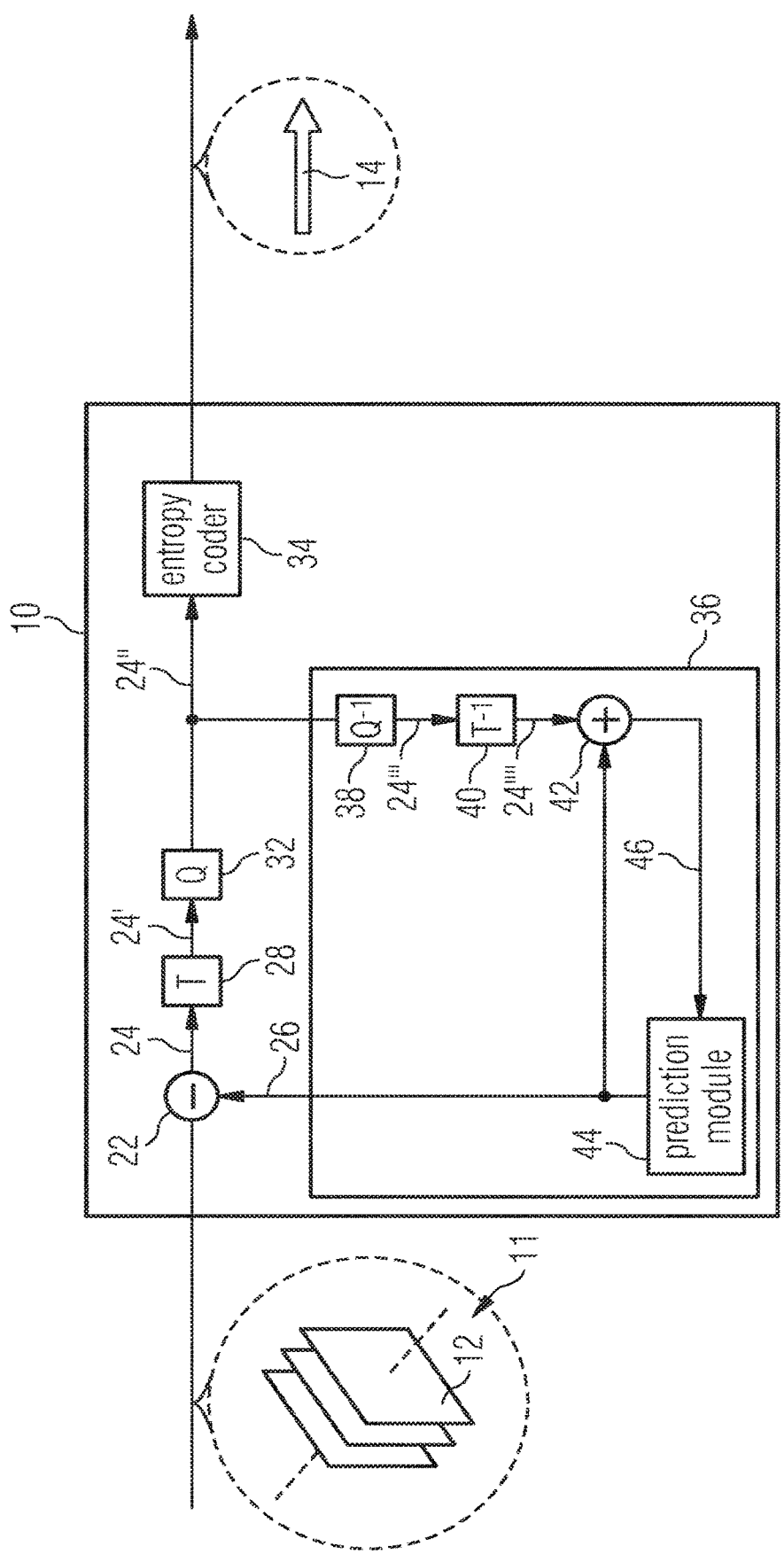
FIG. 1 shows a block diagram of an apparatus for predictively coding a video as an example for a video decoder where a selection of an angular intra-prediction mode for padding concept according to embodiments of the present application could be implemented.
Figure 2:
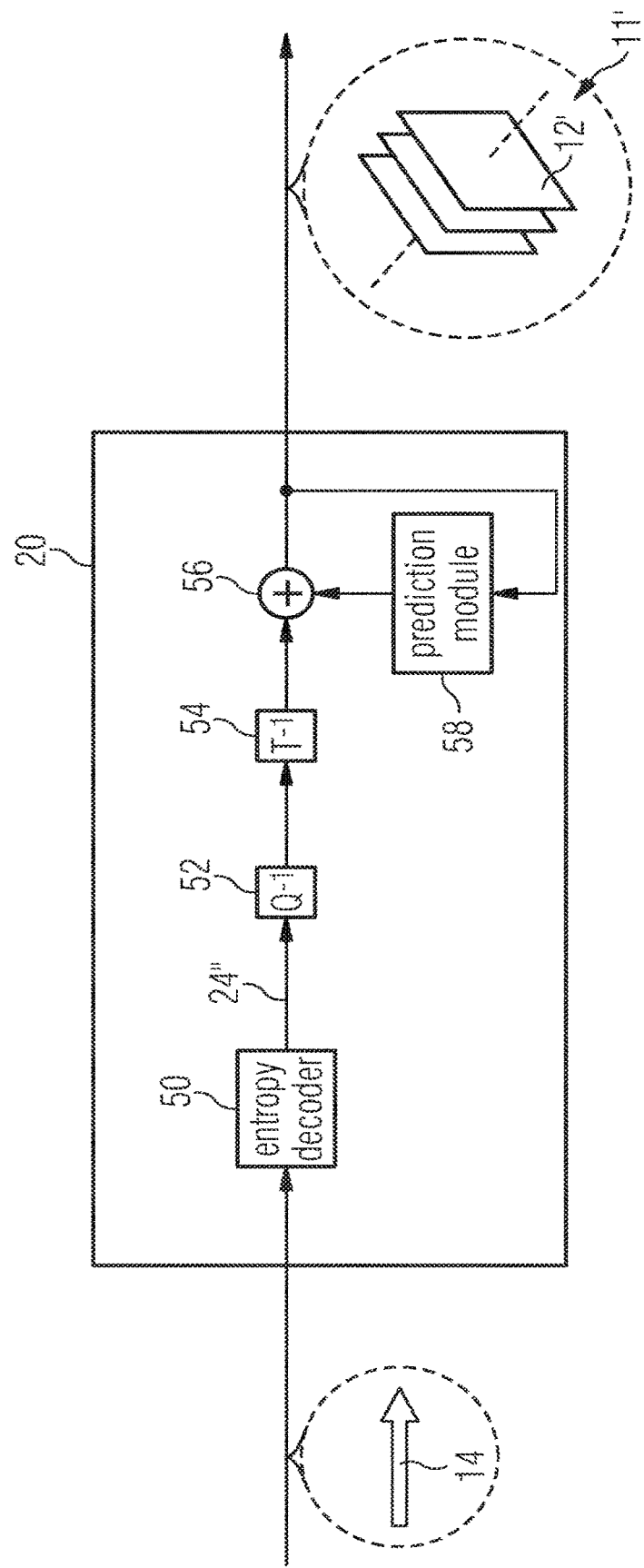
FIG. 2 shows a block diagram of an apparatus for predictively decoding a video, which fits to the apparatus of FIG. 1, as an example for a video decoder where a selection of an angular intra-prediction mode for padding concept according to embodiments of the present application could be implemented.

FIG. 1 shows an apparatus for predictively coding a video 11 composed of a sequence of pictures 12 into a data stream 14. Block-wise predictive coding is used to this end. Further, transform-based residual coding is exemplarily used. The apparatus, or encoder, is indicated using reference sign 10. FIG. 2 shows a corresponding decoder 20, i.e. an apparatus 20 configured to predictively decode the video 11' composed of pictures 12' in picture blocks from the data stream 14, also here exemplarily using transform-based residual decoding, wherein the apostrophe has been used to indicate that the pictures 12' and video 11', respectively, as reconstructed by decoder 20 deviate from pictures 12 originally encoded by apparatusin terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. video 11 or a current picture 12. The prediction residual signal former 22 may, for instance, be a subtractor which subtracts the prediction signal from the original signal, i.e. current picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction residual 26 is generated by a prediction stage 36 of encoder 10 on the basis of the prediction residual signal 24" decoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24"$\propto$ to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'.

A prediction module 44 of prediction stage 36 then generates the prediction signal 26 on the basis of signal 46 by using, for instance, spatial prediction, i.e. intra-prediction, and/or temporal prediction, i.e. inter-prediction. Details in this regard are described in the following.

Likewise, decoder 20 may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely the video 11' or a current picture 12' thereof.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost, and/or using some rate control. As described in more details below, encoder 10 and decoder 20 and the corresponding modules 44, 58, respectively, support different prediction modes such as intra-coding modes and inter-coding modes which form a kind of set or pool of primitive prediction modes based on which the predictions of picture blocks are composed in a manner described in more detail below. The granularity at which encoder and decoder switch between these prediction compositions may correspond to a subdivision of the pictures 12 and 12', respectively, into blocks. Note that some of these blocks may be blocks being solely intra-coded and some blocks may be blocks solely being inter-coded and, optionally, even further blocks may be blocks obtained using both intra-coding and inter-coding, but details are set-out hereinafter. According to intra-coding mode, a prediction signal for a block is obtained on the basis of a spatial, already coded/decoded neighborhood of the respective block. Several intra-coding sub-modes may exist the selection among which, quasi, represents a kind of intra-prediction parameter. There may be directional or angular intra-coding sub-modes according to which the prediction signal for the respective block is filled by extrapolating the sample values of the neighborhood along a certain direction which is specific for the respective directional intra-coding sub-mode, into the respective block. The intra-coding sub-modes may, for instance, also comprise one or more further sub-modes such as a DC coding mode, according to which the prediction signal for the respective block assigns a DC value to all samples within the respective block, and/or a planar intra-coding mode according to which the prediction signal of the respective block is approximated or determined to be a spatial distribution of sample values described by a two-dimensional linear function over the sample positions of the respective block with deriving tilt and offset of the plane defined by the two-dimensional linear function on the basis of the neighboring samples. Compared thereto, according to inter-prediction mode, a prediction signal for a block may be obtained, for instance, by temporally predicting the block inner. For parametrization of an inter-prediction mode, motion vectors may be signaled within the data stream, the motion vectors indicating the spatial displacement of the portion of a previously coded picture of the video 11 at which the previously coded/decoded picture is sampled in order to obtain the prediction signal for the respective block. This means, in addition to the residual signal coding comprised by data stream 14, such as the entropy-coded transform coefficient levels representing the quantized spectral-domain prediction residual signal 24″, data stream 14 may have encoded thereinto prediction related parameters for assigning to the blocks prediction modes, prediction parameters for the assigned prediction modes, such as motion parameters for inter-prediction modes, and, optionally, further parameters which control a composition of the final prediction signal for the blocks using the assigned prediction modes and prediction parameters as will be outlined in more detail below. Additionally, the data stream may comprise parameters controlling and signaling the subdivision of picture 12 and 12', respectively, into the blocks. The decoder 20 uses these parameters to subdivide the picture in the same manner as the encoder did, to assign the same prediction modes and parameters to the blocks, and to perform the same prediction to result in the same prediction signal.

Figure 3:
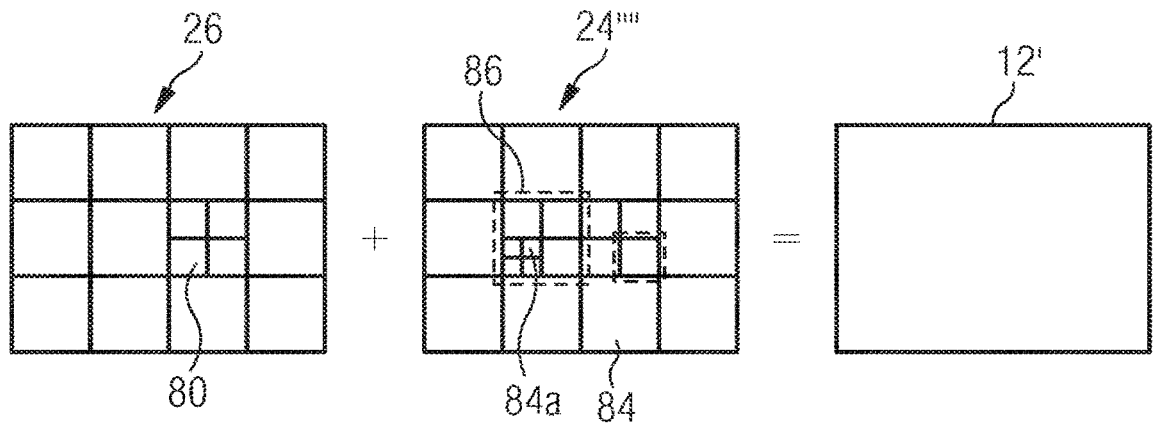
FIG. 3 shows a schematic diagram illustrating an example of a relationship between a prediction residual signal, a prediction signal and a reconstructed signal so as to illustrate possibilities of setting subdivisions for defining the prediction signal, handling the prediction residual signal and the like, respectively.

FIG. 3 illustrates the relationship between the reconstructed signal, i.e. the reconstructed picture 12', on the one hand, and the combination of the prediction residual signal 24″ as signaled in the data stream, and the prediction signal 26, on the other hand. As already denoted above, the combination may be an addition. The prediction signal 26 is illustrated in FIG. 3 as a subdivision of the picture area into blocks 80 of varying size, although this is merely an example. The subdivision may be any subdivision, such as a regular subdivision of the picture area into rows and columns of blocks, or a multi-tree subdivision of picture 12 into leaf blocks of varying size, such as a quadtree subdivision or the like, wherein a mixture thereof is illustrated in FIG. 3 where the picture area is firstly subdivided into rows and columns of tree-root blocks which are then further subdivided in accordance with a recursive multi-tree subdivisioning to result into blocks 80.

The prediction residual signal 24″ in FIG. 3 is also illustrated as a subdivision of the picture area into blocks 84. These blocks might be called transform blocks in order to distinguish same from the coding blocks 80. In effect, FIG. 3 illustrates that encoder 10 and decoder 20 may use two different subdivisions of picture 12 and picture 12', respectively, into blocks, namely one subdivisioning into coding blocks 80 and another subdivision into blocks 84. Both subdivisions might be the same, i.e. each block 80, may concurrently form a transform block 84 and vice versa, but FIG. 3 illustrates the case where, for instance, a subdivision into transform blocks 84 forms an extension of the subdivision into blocks 80 so that any border between two blocks 80 overlays a border between two blocks 84, or alternatively speaking each block 80 either coincides with one of the transform blocks 84 or coincides with a cluster of transform blocks 84. However, the subdivisions may also be determined or selected independent from each other so that transform blocks 84 could alternatively cross block borders between blocks 80. As far as the subdivision into transform blocks 84 is concerned, similar statements are thus true as those brought forward with respect to the subdivision into blocks 80, i.e. the blocks 84 may be the result of a regular subdivision of picture area into blocks, arranged in rows and columns, the result of a recursive multi-tree subdivisioning of the picture area, or a combination thereof or any other sort of segmentation. Just as an aside, it is noted that blocks 80 and 84 are not restricted to being quadratic, rectangular or any other shape. Further, the subdivision of a current picture 12 into blocks 80 at which the prediction signal is formed, and the subdivision of a current picture 12 into blocks 84 at which the prediction residual is coded, may not the only subdivision used for coding/decoding. These subdivision from a granularity at which prediction signal determination and residual coding is performed, but firstly, the residual coding may alternatively be done without subdivisioning, and secondly, at other granularities than these subdivisions, encoder and decoder may set certain coding parameters which might include some of the aforementioned parameters such as prediction parameters, prediction signal composition control signals and the like.

FIG. 3 illustrates that the combination of the prediction signal 26 and the prediction residual signal 24″″ directly results in the reconstructed signal 12'. However, it should be noted that more than one prediction signal 26 may be combined with the prediction residual signal 24″″ to result into picture 12' in accordance with alternative embodiments such as prediction signals obtained from other views or from other coding layers which are coded/decoded in a separate prediction loop with separate DPB, for instance.

In FIG. 3, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

In any case, it should be noted that the set of supported transforms may comprise merely one transform such as one spectral-to-spatial or spatial-to-spectral transform.

As already outlined above, FIGS. 1 to 3 have been presented as an example where the composed-prediction concept described further below may be implemented in order to form specific examples for video encoders and decoders according to the present application. Insofar, the video encoder and decoder of FIGS. 1 and 2, respectively, represent possible implementations of the video encoders and decoders described herein below. As will be outlined in more detail below, when having the subsequently explained embodiments for composed prediction according to the present application built into the video encoder and decoder of FIGS. 1 and 2, the video encoder of FIG. 1 and the video decoder of FIG. 2 support, at least as one option, to process a block 80 in the manner outlined in more detail below, or even all blocks a current picture 12 is composed of. Thus, the embodiments described hereinafter, inter alias, refer to a video encoder which equals the encoder 10 of FIG. 1 which treats blocks 80 in the manner outlined in more detail below and the same applies with respect to the decoder of FIG. 2 which, thus, represents an example for a video decoder according to an embodiment where blocks 80 are treated in the manner outlined in more detail below. FIGS. 1 and 2 are, however, only specific examples. A video encoder according to embodiments of the present application may, however, perform block-based encoding using the concept outlined in more detail below and being different from the encoder of FIG. 1 such as, for instance, in that the sub-division into blocks 80 is performed in a manner different than exemplified in FIG. 3, or in that this encoder does not use transform prediction residual coding with coding the prediction residual, for instance, in spatial domain directly instead. Likewise, video decoders according to embodiments of the present application may perform decoding from data stream 14 using the composed-prediction coding concept further outlined below, but may differ, for instance, from the decoder 20 of FIG. 2 in that sub-divides picture 12' into blocks in a manner different than described with respect to FIG. 3 and/or in that same does not derive the prediction residual from the data stream 14 in transform domain, but in spatial domain, for instance.

In particular, with respect to the block-subdivisioning into blocks 80, it is noted that same may be done in the manner outlined with respect to FIG. 3 or in a different manner. A subdivisioning into transform blocks, if present, may also be done as described with respect to FIG. 3 or in a different manner. In particular, the subdivisioning into blocks on the one hand and into other blocks on the other hand, such as transform blocks, may be done independent from each other by separately subdividing picture 12 into these blocks, respectively, or in a dependent manner. For instance, one subdivision such as the subdivision into transform blocks may form an extension of the other subdivision as described above, or both subdivisions may form separate extensions of a common primary subdivision such as, for instance, the subdivision of the picture into an array of tree root blocks as described with respect to FIG. 3. And such possibilities also apply for other sub-picture granularities which will be mentioned below such as with respect to the definition of certain prediction parameters, prediction modes, contribution weights or the like. Different subdivisions may be used for different ones of these entities and same may be defined independent from each other, partially independent or as extensions from one another.

Having said this, the following description concentrates on circumstances where motion vectors point to portions in the plane of a reference picture which cross borders of these reference pictures beyond which no picture content is available. In order to pad the sub-portion which extends beyond the borderline or completely lies outside the reference picture, a selection of one of a plurality of intra-prediction modes is done in accordance with embodiments of the present invention. The aim is to improve a temporal inter-prediction quality by selecting the most appropriate angular intra-prediction mode for padding based on the characteristics of the predicted block.

In the following description, the term "referenced pixel area" corresponds to "referenced portion", "reference frame" corresponds to "reference picture", "frame border" corresponds to "a border of the reference picture", "border pixel" corresponds to "border sample", and "template area" corresponds to "probe area". Each corresponding terms could be used in the description. In addition, "padding" is the same meaning as "boundary padding" in this application document. Furthermore, in the following embodiments, one of a plurality of angular intra-prediction mode is selected as an example of an intra-prediction mode for padding. However, the intra-prediction modes of the present invention are not limited to angular intra-prediction modes, but the plurality of intra-prediction modes may include a DC and/or a planar modes and/or a mode for padding other intra-prediction modes, for instance. In a case of the DC and planar modes, for the sake of the border samples, the perpendicular direction (perpendicular to the frame border) may be used.

Figure 4:
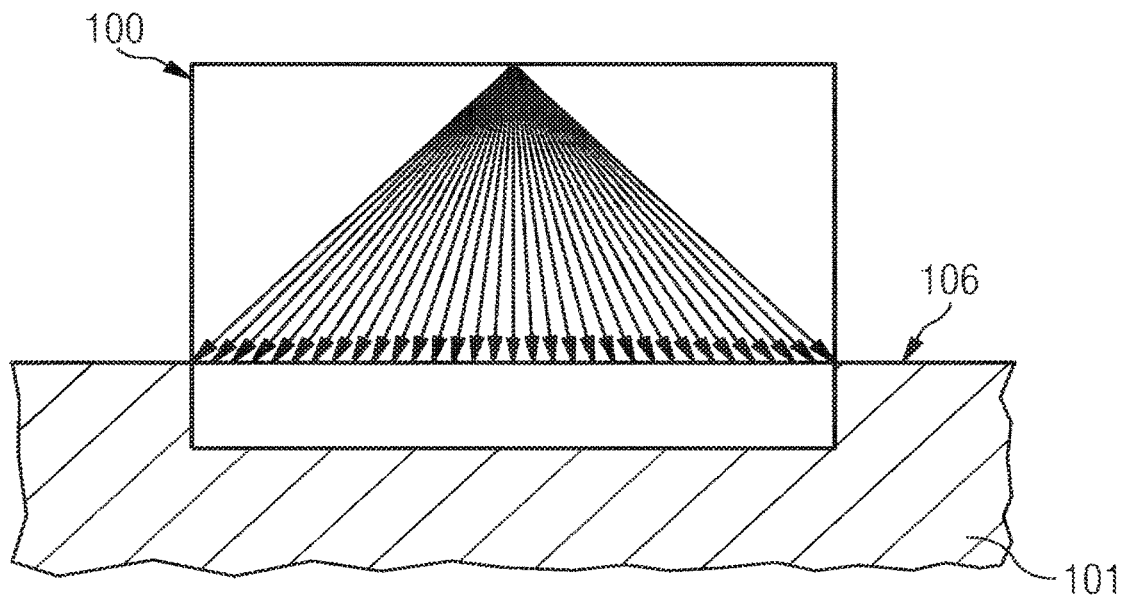
FIG. 4 shows a schematic view illustrating an example of angular intra-prediction modes which are used for the embodiments of the present application.

FIG. 4 shows 33 different angular intra-prediction modes used for embodiments of the present application. Here, the prediction angles in a referenced portion (a referenced pixel area) 100 of a reference picture (reference frame) 101 lie between the range of 45° and 135° with respect to a frame border (a border of a reference picture) 106 as shown in FIG. 4.

The implemented angular border, padding follows the angular intra-prediction of the Joint Exploration Test Model (JEM) as described in Reference 2. Please note that the angular intra-prediction algorithm in JEM assumes that the left and top border pixels of an area are always available for prediction. Nevertheless, the basic prediction algorithm assumes all border pixels in a straight line and therefore a translation of either the left or the top border pixels is performed in JEM. This translation step is omitted in the embodiment of this application. Furthermore, JEM uses 65 angular intra-prediction modes composed out of 33 vertical and 33 horizontal modes. In the embodiment of this application, only the 33 vertical modes are used as shown in FIG. 4. Further please note that the method for vertical angular prediction in JEM has to be rotated by 0°, 90°, 180° or 270° clockwise to perform the boundary padding of the bottom, left, top or right reference frame border 106 respectively.

In case the referenced pixel area 100 lies in part or in whole outside the reference frame 101 in horizontal and in vertical direction, e.g. at the reference frame edges (i.e., frame corner), the advantageous boundary padding side is computed. In the following, $N_{Hor}$ and $N_{Ver}$ denote the number of horizontal and vertical lines of the referenced pixel area 101 which lie outside of the reference frame area. In dependence to the frame edge and $N_{Hor}$ and $N_{Ver}$ the advantageous boundary padding side can be computed as follows:

If edge==Top-Left-Edge then
  If $N_{Ver}$>$N_{Hor}$ then Top-Side else Left-Side
Else if edge==Top-Right-Edge then
  If $N_{Ver}$>$N_{Hor}$ then Top-Side else Right-Side Else if edge==Bottom-Right-Edge then
  If $N_{Ver}>N_{Hor}$ then Bottom-Side else Right-Side
Else if edge==Bottom-Left-Edge then
  If $N_{Ver}>N_{Hor}$ then Bottom-Side else Left-Side For this calculated advantageous boundary padding side, the selected angular intra-prediction mode according to the claims is applied. For the remaining side, the original perpendicular boundary padding process is applied as shown in FIG. 5.

Figure 5:
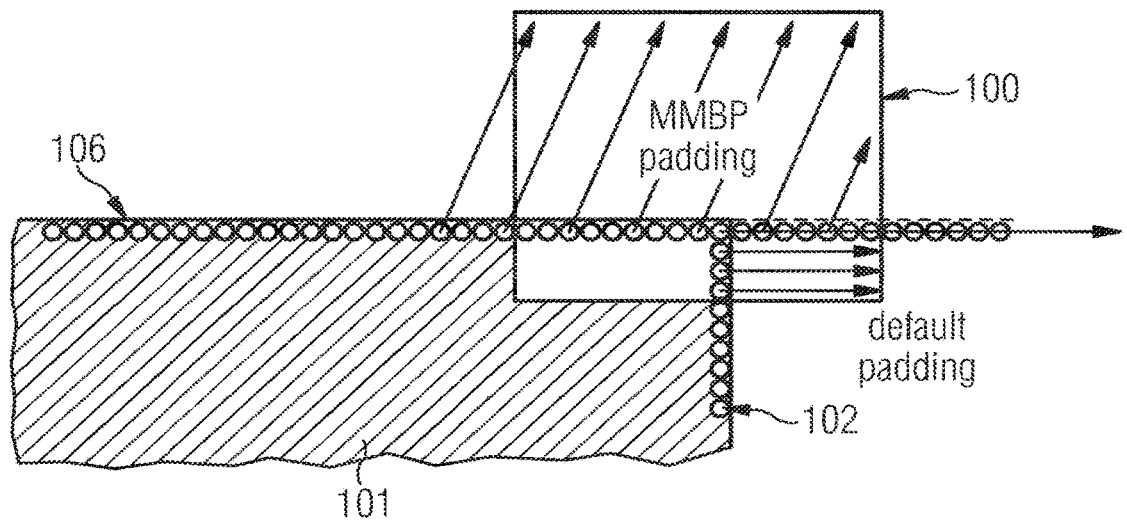
FIG. 5 shows a schematic view illustrating an example of calculating advantageous boundary padding side in accordance with an embodiment of the present application.

In FIG. 5, at a frame border 106, the overlapping referenced pixel area 100 is divided into an area, where Multimode boundary padding (MMBP) is used and, a remaining area, where the default padding is used. In this case, perpendicular padding is used as default padding.

Figure 6:
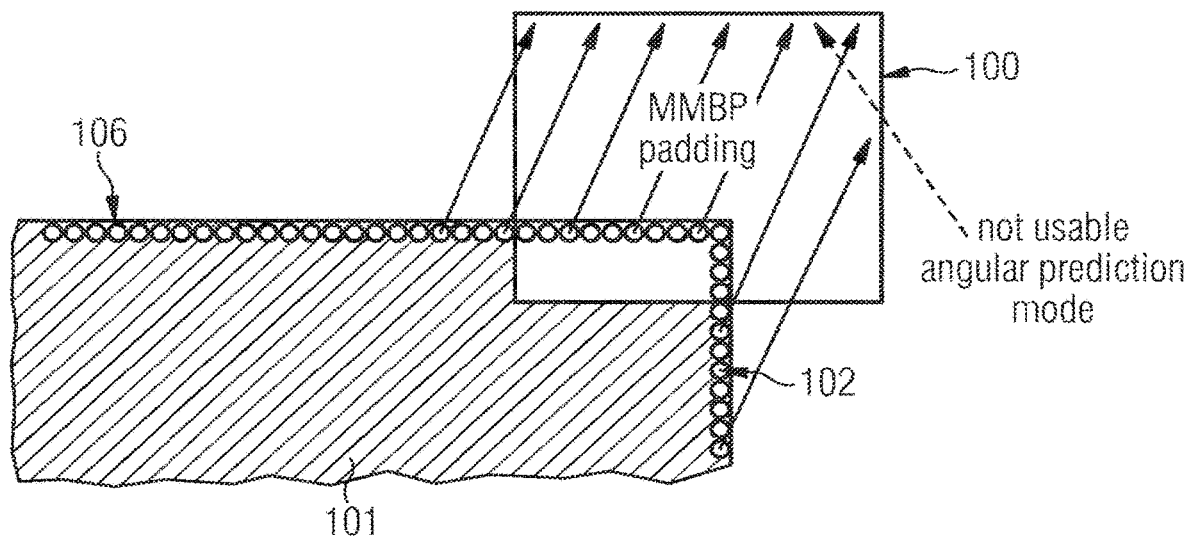
FIG. 6 shows a schematic view illustrating further example of calculating advantageous boundary padding side in accordance with an embodiment of the present application.

Alternatively, the referenced pixel area 100 outside the reference frame 101 is padded entirely by MMBP as shown in FIG. 6. In this case, not all angular intra-prediction modes can be used, because in dependence to the prediction angle the MMBP padding may use border pixels 102 which are not available, for example, as shown with dot arrow in FIG. 6. To further note, that the restriction of the angular intra-prediction modes can be determined implicitly by encoder (10) and decoder (20) without the need to signal the restricted subset. For this purpose, the prediction direction of the corner pixels of the predicted part of the referenced pixel area is inverted by 180°, to test whether all border pixels that may be used are available.

Figure 7:
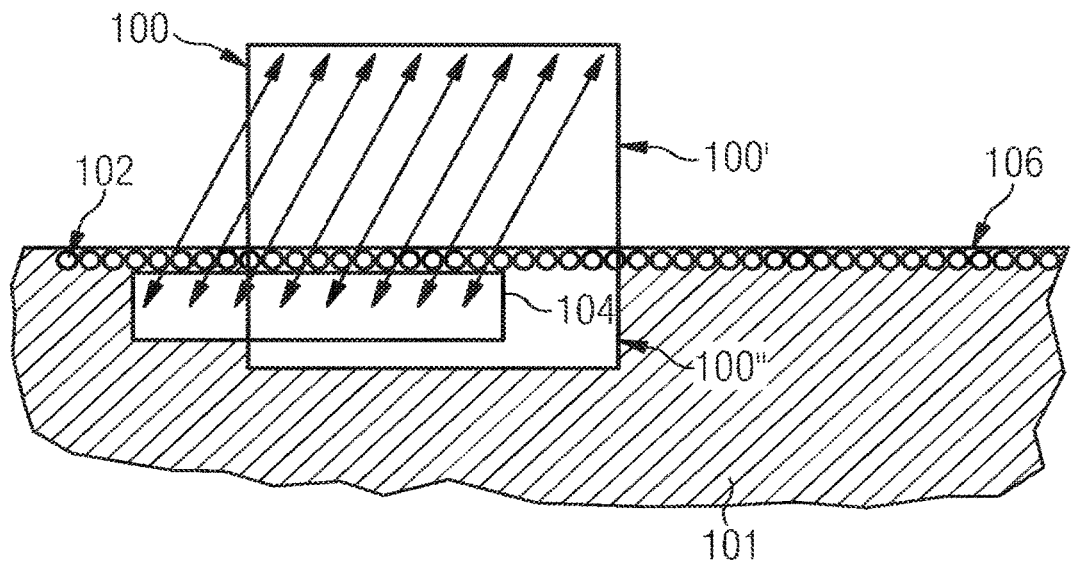
FIG. 7 shows a schematic view illustrating an example of a probe area in accordance with an embodiment of the present application.

In this embodiment, the most appropriate angular inter-prediction mode for boundary padding is derived in the video encoder 10 and the video decoder 20 whenever the referenced pixel area lies in part or in whole outside the reference frame area. As a precondition, the referenced pixel area 100 is divided into the area 100' which is outside of the reference frame 101 and the area 100" which is inside the reference frame 101 as shown in FIG. 7. All pixels inside the reference frame 101 are used directly as input pixels for the motion compensated prediction of the current predicted block. All pixels outside the reference frame 101 in the area 100' are predicted with the help of an intra-prediction from the adjacent border pixels 102 of the reference frame 101 as described below. Please note that an angular intra-prediction with a perpendicular angle of 90° corresponds to the state of the art reference frame border padding used in H.265 and JEM.

To select one of a plurality angular intra-prediction mode in encoder 10 and decoder 20, the direction of each intra-prediction might be rotated by 180° to point inwards of the reference frame 101. Then a template area, i.e., a probe area 104 is defined based on the rotated intra-prediction, which lies inside the reference frame 101 as shown in FIG. 7. Size and shape of the template area 104 are not restricted. For example, one possible shape could be a rectangular block. For each mode and the associated template area 104 a rotated intra-prediction is performed from the adjacent border pixels 102 to predict all pixel values within the template area 104. The most appropriate angular intra-prediction mode is selected by evaluating the result of above mentioned prediction.

For evaluating, the predicted pixels are compared with the already reconstructed pixels of the reference frame 101 within the template area 104 to derive the final angular intra-prediction mode. With the claimed wording, a probe area (template area) 104 is filled, and the filling probe is compared with the reconstructed filling of the probe area 104 to measure a similarity between them. For this comparison, any measure of similarities between blocks can be used, e.g., a sum of absolute differences (SAD), a sum of absolute transformed differences (SATD), a sum of squared errors (SSE), Hadamard transform and others. In order to improve the prediction, content dependent transforms can be used to transform the information into another domain that is less sensitive, e.g., to the position. Such content dependent transforms can also be trained. The angular intra-prediction mode with the highest similarity measure between predicted pixels and reconstructed pixels within the template area 104 could be finally chosen to be used for the padding of the area 100' of the referenced portion 100 of the reference picture 101 which extends beyond the border 106 of the reference picture 101.

Figure 8:
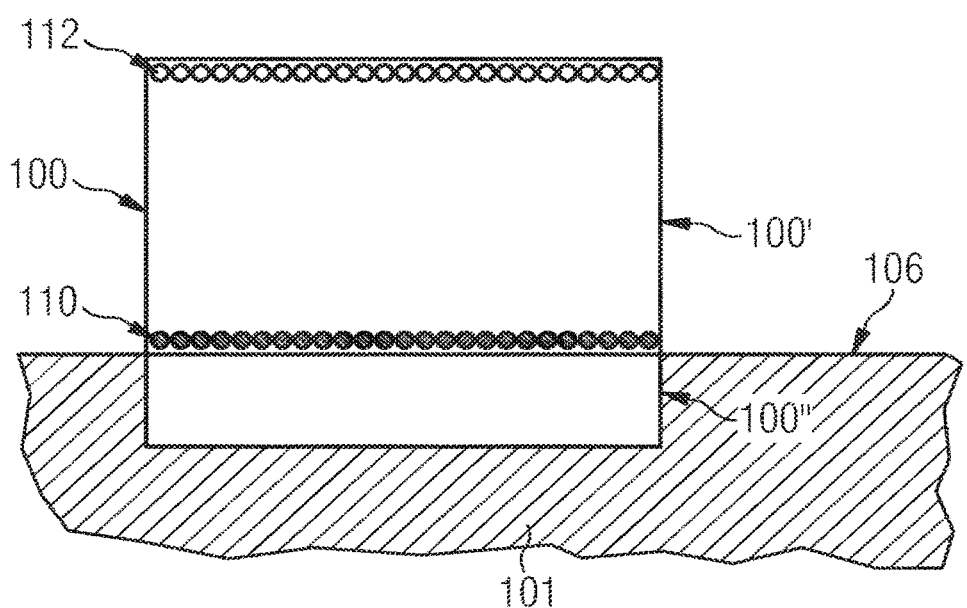
FIG. 8 shows a schematic view illustrating an example used to describe a process of defining the probe area in accordance with an embodiment of the present application.

As a modification of the above embodiment, a plurality of (for example, Number N of) different template areas (probe areas) could be used, assuming N=2 in the following, for each angular intra-prediction mode to further improve selection accuracy. For example, the first template area is defined in dependence to the outermost pixel line 112 of the referenced pixel area 100 with respect to the frame border 106 as shown in FIG. 8. The second template area is defined in dependence to the first pixel line 110 of the referenced pixel area 100, which lies in the area 100' of the reference frame 101 as shown in FIG. 8.

For these both pixel lines 110, 112 in the referenced pixel area 100, the angular intra-prediction mode is inverted to determine the left-most and right-most frame border pixels, which have to be used for the angular intra-prediction. Without restriction of any kind, it is assumed in the following that the referenced pixel area 100 overlaps the reference frame 101 at the top of the frame border 106 (or the advantageous padding side is the top side). In this case, the left-most and right-most frame border pixels have the coordinates $\{x_{left-most}; 0\}$ and $\{x_{right-most}; 0\}$ as shown as a table in FIG. 9. The associated template area is then defined by a rectangular shape with the top-left and bottom-right coordinates of $\{x_{left-most}-1; 1\}$ and $\{x_{right-most}+1; 3\}$. This means the template area includes the next two pixel lines inside the reference frame below the used frame border pixels 102, extended by one additional pixel into left and right direction. In case the referenced pixel area 100 overlaps the reference frame 101 at the left, right or bottom frame border (or the advantageous padding side is left, right or bottom side), the template area has to be rotated accordingly and is defined by the table shown in FIG. 9. That is, the area 100' extends to the top side of the reference picture 101, i.e., above the border 106, the template area is defined as explained above. In case the area 100' extends to the left side of the reference picture 101, the template area is rotated with respect to the left side border of the reference picture 101. The coordinate of defined template area is derived based on the table in FIG. 9, where height and width in the table in FIG. 9 are the size of the reference picture 101.

As mentioned above, first template area based on the first pixel line 110 and second template area based on the outmost pixel line 120 are defined in consideration of the table of FIG. 9. Then, the pixel values inside both of these template areas are predicted by rotating the original angular intra-prediction by 180°, i.e., both template areas (probe areas) are filled based on border samples (border pixels) 102 of the reference picture 101 at the portion of the border 106, along a direction opposite to a filling direction associated with the respective angular intra-prediction mode as shown in FIG. 7. Therefore, the angular prediction scheme follows the angular intra-prediction of the Joint Exploration Test Model (JEM) as described in Reference 2. Then, the predicted pixel values inside both template areas are compared with the reconstructed reference pixels by using a sum of absolute differences (SAD) similarity measure. The final angular intra-prediction mode could be selected to be the mode with the minimum sum of the SAD values of both template areas in case of N=2, i.e., the angular intra-prediction mode has the highest similarity between the filling probe and the filling reconstructed could be selected. Please note that also other pixel lines of the referenced pixel area could be used to define the template areas. Furthermore, for example, also the middle pixel line between the outermost pixel line and the first outlining line could be used to define the template area. In addition, the similarity measures could also include a weighting of samples within each probe area for characteristics such as luma intensity or edge detection to differentiate the importance of samples, thereby giving unequal weights to the similarity contribution to the similarity measure for each sample in the template area is based on psycho-visual weighting performed.

In addition, the high-level parameters controlling the behavior of the boundary padding with derivation of the angular intra-prediction mode for padding may include the size and shape of the template area. This means, the number of additional pixel lines perpendicular to the frame border and an optional extension of the template area could be parallel to the frame border to the left and right side. Additionally, a high-level parameter may be introduced to specify the lines in the referenced pixel area which are used to define the template areas, e.g. outermost line, first line out of reference frame or middle line between outermost and first line. Furthermore a reduction of the number of used angular intra-prediction modes may be signaled. Additional high-level parameters may be introduced to specify a minimum and/or a maximum threshold which define how much the referenced pixel area has to lie outside the reference frame to select an angular intra-prediction mode for padding. That is, the threshold could define the amount of extended area of referenced portion outside of the reference picture. The high-level parameters may be signaled in a picture parameter set (PPS), sequence parameter set (SPS), slice header or any other high-level syntax structure.

Figure 10:
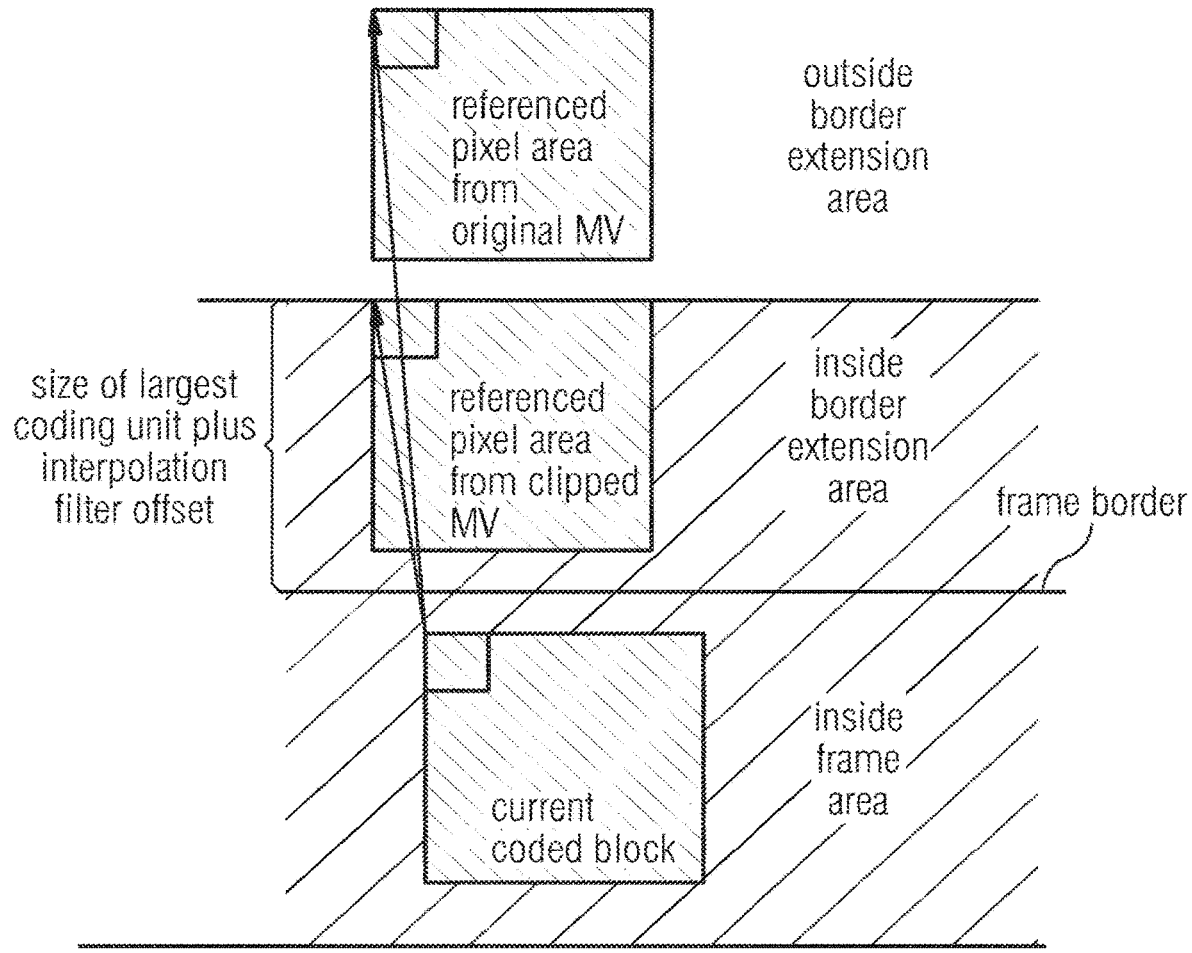
FIG. 10 shows a schematic view illustrating an example of motion vector clipping for border extension reference block in accordance with an embodiment of the present application.

Furthermore, regarding the process for selecting probe area selection, known codecs featuring a perpendicular border extension could be used. In implementations the perpendicular border extension, a technique known as motion vector (MV) clipping is commonly used to lower the memory cost associated with storing the sample values of border extension samples. As for the repetitive nature of sample values in a perpendicular border extension, it is advisable to clip motion vectors that result in a reference block which contains only border extension samples. The contents of the reference block resulting from the clipped MV are similar to the original reference block. However, a decoder implementation may save resources using such samples by generating a border extension of limited size. Commonly, a fixed size limit such as the size of the largest coding unit plus size of the interpolation filter kernel is used to be able to fit every potential reference block size into the limited amount of generated border extension sample as illustrated in FIG. 10.

Figure 11:
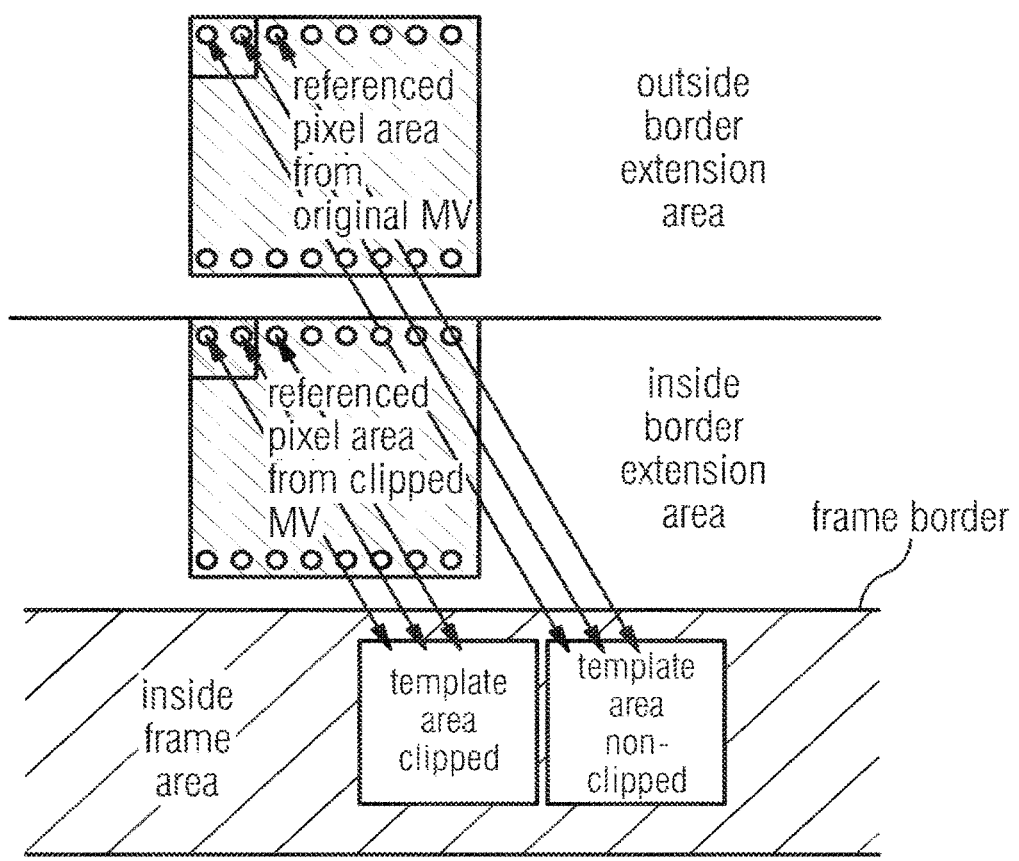
FIG. 11 shows a schematic view illustrating an example of template area derivation in context of motion vector clipping in accordance with an embodiment of the present application.

As illustrated in FIG. 11, the distance of the referenced pixel area from the frame border in Multi-mode boundary padding (MMBP) influence the selection process of probe area on decoder 20 side. It is therefore useful, that MV clipping is carried out in a coordinated fashion on encoder 10 and decoder 20 sides to avoid mismatches resulting from usage of different probe areas. One aspect of this invention therefore are as mentioned above, high-level syntax elements in bitstream structures such as parameter sets, slice headers or others that allow the encoder 10 to indicate, or a corresponding bitstream constraint indicating to the decoder 20, the used MV clipping procedure. Such syntax elements include, for instance, a maximum MV length or reference block to frame border distance from which on MV clipping is carried out, as well as, a size to which MV are clipped or the distance between frame border and the reference pixel area resulting from the clipped motion vector. The included information is not limited to above mentioned information, but further information or other information could be also included.

Figure 12:
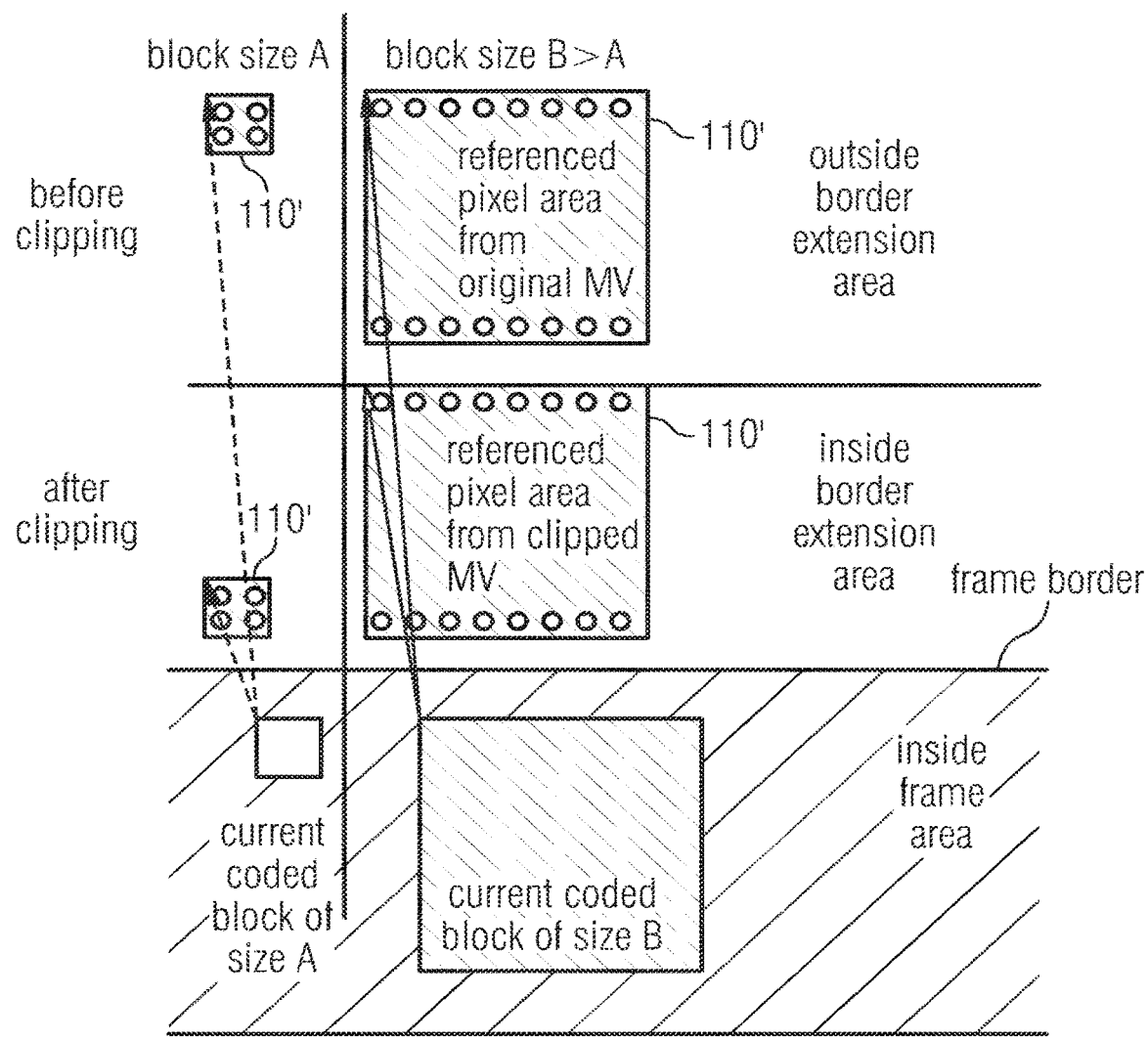
FIG. 12 shows a schematic view illustrating an example of motion vector clipping adaptive to block size in accordance with an embodiment of the present application.

Furthermore, adaptive MV clipping can be used to control probe area selection in a beneficial way by adjusting the amount of clipping to the size of the referenced pixel area, i.e., the referenced block size. As illustrated in FIG. 12, the same MV is used for two blocks of different size B>A and the adaptive MV clipping results in two different MVs colored, for example, in red that lead to the referenced area being as close as possible to the frame border which also minimizes distance to the selected probe area. That is, for smaller seize referenced portion 110', i.e., block size A (smaller block), an amount of motion vector is larger than for the larger size referenced portion 110', i.e., size B (larger block). Therefore, clipping the coordinate of the motion vector of the inter-predicted block of the current picture by amount which depends on a size of the referenced portion so that the amount is larger for smaller size. Another aspect of this invention therefore is high-level syntax elements in bitstream structures as such as parameter set slice header or others that allow the encoder 10 to indicate, or a corresponding bitstream constraint indicating to the decoder 20, that MV clipping is carried out in a way adaptive to the reference block size.

The amount of coding options to evaluate on encoder side is an important factor for the complexity of a codec. One aspect of the present invention is hence a measure to control the complexity impact of the boundary padding described herein. This measure is constituted by carrying out motion estimation on encoder, i.e. the search and coding cost evaluation of different motion-compensated predictor samples for inter-prediction, by extending known motion estimation by a second stage. While the first motion compensation stage encompasses all steps of known motion compensation (e.g. generate known boundary padding samples and evaluate the coding cost of residual data for a given predictor), a second stage is amended to known motion compensation wherein the best predictor is further enhanced through a more sophisticated boundary sample padding scheme such as the ones described herein.

Figure 13:
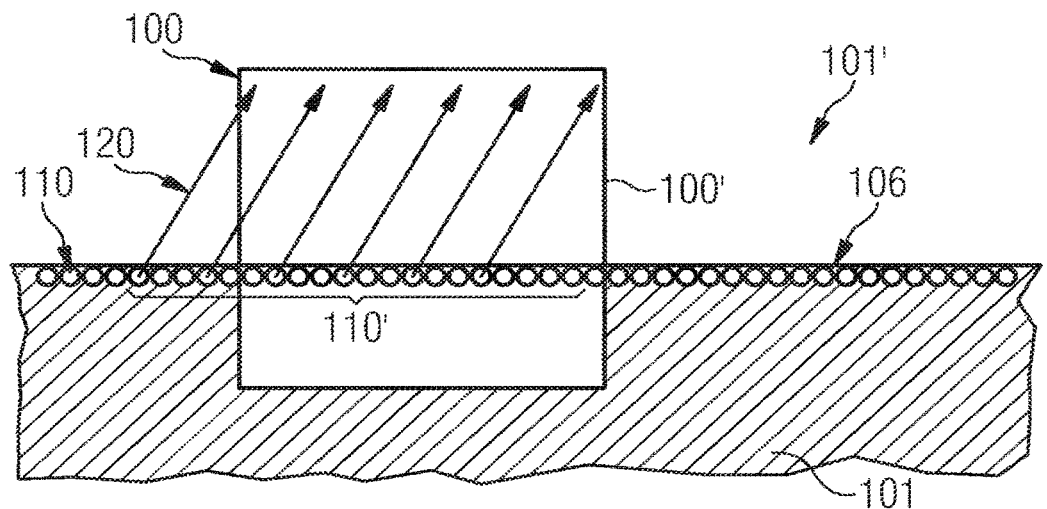
FIGS. 13 and 14 show a schematic view illustrating an angular intra-prediction mode to be used for padding that is selected based on a prediction result of the area of the referenced portion which is outside of the reference picture in accordance with the present application.
Figure 14:
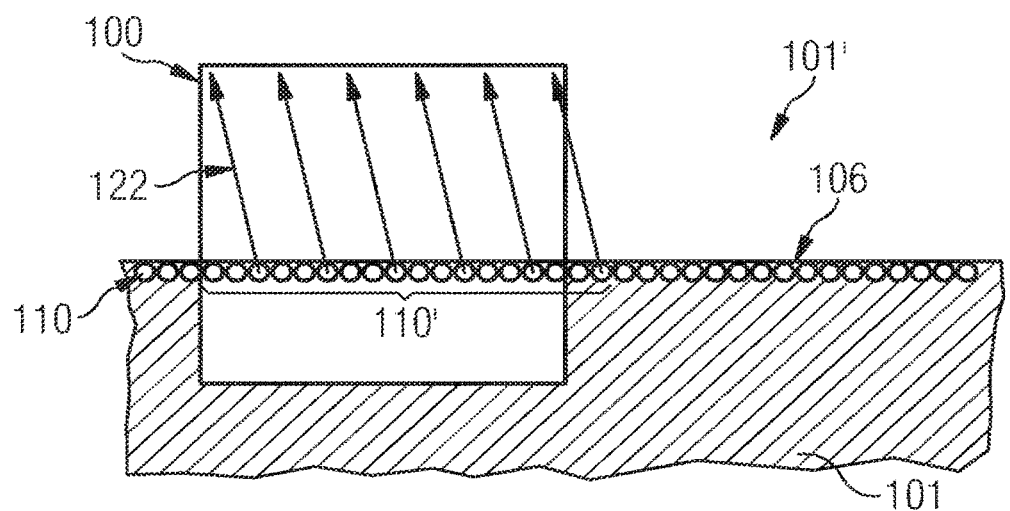

In case the referenced portion lies in part or in whole out of the reference picture, the following other embodiment is also applied. As already mentioned above, as prerequisites, the referenced pixel area is divided into the area outside of the reference frame area and the area inside the reference frame area. All pixels inside the reference frame area are used directly as input pixels for the motion compensated prediction of the current predicted block. All pixels outside the reference frame area are predicted with the help of an angular intra-prediction from the adjacent border pixels of the reference frame as described in FIGS. 13 and 14. That is, the area 100' of the referenced portion 100, i.e., the area 100' outside of the border 106 of the reference picture 101 within the referenced portion 100 is filled based on the border samples 110. The filling direction is selected from 33 different angular intra modes. In this case, it is not required to select from 33 angular intra modes, but it could be selected from limited number of angular intra-prediction modes as defined as a parameter in advance. FIG. 13 shows one angular intra-prediction mode 120, and FIG. 14 shows other angular intra-prediction mode 122. In FIGS. 13 and 14, the used border pixels 110' directly depend on the selected angular intra-prediction mode 120 and 122 respectively. To further note, as angular intra-prediction mode with a perpendicular angle of 90° correspondents to the state of the art reference frame border padding used in H.265 and JEM. The chosen, i.e., selected angular intra-prediction mode is signaled to the decoder within the encoded bitstream.

In addition, the selected angular intra-prediction mode could be coded using context-based adaptive arithmetic coding (CABAC). In addition, an enable flag is used to indicate whether the default perpendicular boundary padding or the boundary padding based on the selected angular intra-prediction mode is applied. Due to the fact that the default perpendicular mode is one of the 33 angular intra-prediction modes, the remaining 32 angular intra-prediction modes can be coded with five additional CABAC bins. The enable flag, as well as the remaining angular modes are coded as a series of binary decisions with adaptive binary probability models (a subset of these bins, for example, the angular intra-prediction modes may also be coded with non-adaptive probability models). In order to model the enable flag, different context models might be used which can be selected based on the amount that the referenced pixel area lays out of the reference frame. For example, different context models could be used for cases when less than ¼, less than ½, less than ¾ or more than ¾ of the referenced pixel area lie out of the reference frame.

Alternatively, a list of most probable modes (MPM) is used to signal frequently occurring angular intra-prediction mode for boundary padding. Possible MPM candidates might be the angular intra-prediction modes for boundary padding of adjacent blocks which have been coded before, in case an angular intra-prediction mode for boundary padding is available for these blocks. Other MPM candidates might be the angular intra-prediction modes of adjacent previously coded blocks, if available. Furthermore the angular intra-prediction modes of a coded block in the reference frame collocated to the referenced picture could be used as MPM candidate. In addition, the angular intra-prediction modes of a coded block in the associated random access point picture collocated to the referenced picture area could be used as MPM candidate. In case of 33 angular intra-prediction modes, the MPM candidate list contains one MPM candidate mode. A CABAC binary flag is used to signal whether the MPM candidate should be used. The remaining 32 angular modes can be signaled with 5 CABAC bins. The MPM flag, as well as the remaining angular intra-prediction modes are coded as a series of binary decisions with adaptive binary probability models as explained above.

The angular intra-prediction mode for boundary mode is part of the motion information of a coded block. Therefore, in case the motion information is used/copied by a different coded block, e.g. in case a merge mode or motion vector prediction is used, the angular intra-prediction mode for boundary padding associated with the copied motion vector might be copied as well and applied in case the referenced pixel area lies outside of the reference frame area. In the case of motion vector prediction from a block for which MMBP is activated, the selected angular intra-prediction mode for padding might become the MPM for the coding of the padding direction of the current coded block, if MMBP is used for the coded block. Alternatively, the possible motion prediction candidates might provide a list of possible MPMs.

The high-level parameters controlling the behavior of the partial boundary padding with signaling of the selected angular intra-prediction mode for padding may include a parameter to define a sub-set of the angular intra-prediction modes which should be used for boundary padding. In this case, the number of supported angular intra-prediction modes for padding can be restricted to a smaller number, less CABAC bins have to be used for signaling the selected angular intra-prediction modes for boundary padding. For example, using only a subset of 18 angular modes in combination with a MPM candidate list of 2 modes, only 16 angular modes remain which can be encoded with 4 CABAC bins (thus resulting in 2 bins for signaling of the MPM mode and 5 bins for signaling the remaining non-MPM modes). Additional high-level parameters may be introduced to specify a minimum and/or a maximum threshold which define how much the referenced pixel area has to lie outside the reference frame area to select the most appropriate angular intra-prediction mode for padding as described above. The high-level parameters may be signaled in a picture parameter set (PPS), sequence parameter set (SPS), slice header or any other high-level syntax structure.

The above-mentioned embodiments could be combined, e.g., the embodiment using template and other embodiment signaling the selected angular intra-prediction mode as described above could be combined as a further embodiment explained below.

The selection of angular intra-prediction modes follows the embodiment as explained by FIG. 7. In this embodiment, an ordered list of angular intra-prediction modes for padding is generated based on the similarity measure as described above. This ordered list of generated angular intra-prediction modes for padding is truncated by a pre-defined value of max signaled angular intra-prediction modes for padding. Finally the selected angular intra-prediction modes for padding within this truncated ordered list are signaled using context-based adaptive arithmetic coding (CABAC) as described above.

As already mentioned above, an enable flag might be used to indicate whether the default perpendicular boundary padding or the truncated ordered list of selected padding modes should be used. In addition, the number of signaled padding modes is set to 2N which can be signaled with N CABAC bins. The selected angular intra-prediction modes are coded as a series of binary decisions with adaptive binary probability models (a subset of these bins may also be coded with non-adaptive probability models). In case binary probability models are used to encode the selected angular intra-prediction modes, different context models might be used which can be selected based on the amount of the area of the referenced portion which lies outside of the reference frame area as described above. Furthermore, the truncated ordered list of the selected angular intra-prediction modes for padding is used as MPM candidate list. Here, the MPM candidate list and the remaining angular intra-prediction modes for padding can be encoded as described above. Moreover, the same high level parameters as described above, e.g., a parameter to define a sub-set of the angular intra-prediction modes, thresholds for the application of the selected angular intra-prediction mode and parameters to define the size and shape of the template area, might also be used. Also, as described above, the high-level parameters may be signaled in a picture parameter set (PPS), sequence parameter set (SPS), slice header or any other high-level syntax structure.

In an embodiment of the present application, the high-level syntax includes syntax elements by which the multi-mode boundary padding is controlled. The high-level syntax elements are transmitted in one or more high-level syntax structures, such as the sequence parameter set (SPS: valid for all pictures inside a coded video sequence), the picture parameter set (PPS: valid for one or more pictures), the slice header (valid for a slice), etc.

The high-level syntax elements which control the application to select angular intra-prediction mode can include, but are not restricted to, one or more of the following parameters:
- a flag or IDC signaling which angular inter prediction mode for padding (MMBP, perpendicular or omnidirectional padding) should be applied;
- a parameter to signal or a constraint indicating frame-boundary-wise combinations of padding modes; for example, it could be signaled in the data stream for a portion along the reference picture's frame boundary or outer picture border as to whether MMBP is used or omnidirectional padding is used; as one option, it could be signaled that both options are available; for different portions different available modes could be signaled so that the encoder and decoder would check with which portion of the reference picture's frame boundary the referenced area overlaps or which portion the referenced area crosses, so as to decide as to which intra-prediction mode to use;
- a parameter to signal which selection process of above mentioned embodiment is used;
- a parameter to signal which angular intra-prediction modes can be used for MMBP;
- a parameter specifying which exact angular intra-prediction modes are used for specific reference frame boundary regions;
- a minimum and/or a maximum threshold which define how much the referenced pixel area has to lie outside the reference frame area to apply to select angular intra-prediction mode;
- parameters to signal the size and shape of the template area; and
- a parameter to signal the set of lines in the referenced pixel area which are used to determine the template areas As to the second alternative, the following is additionally noted: While the above-outlined embodiments used angular intra-prediction modes as examples, out of which the intra-prediction mode for padding was finally chosen, it is clear that the perpendicular padding mode padding according to which padding is performed by perpendicularly extrapolating the border samples into the area exceeding the frame boundary, is also an intra-prediction mode just as the omni-directional padding mode is an intra-prediction mode according to which the area lying outside the frame boundary is filled/padded using samples inside the same frame, namely the reference frame. Thus, the high level syntax reveals as to which intra-prediction mode should be used, or which intra-prediction mode(s) is/are available for which portion of the frame boundary, wherein different ones may be signaled to be used or be available for different portions of the frame boundary, such as the omni-directional mode for one portion such as the right and left hand side boundary and the perpendicular mode for the other portion of the frame boundary such as the upper and lower boundary. The encoder and decoder would simply have to recognize the portion of the frame boundary a certain referenced area of an inter-predicted block 80 exceeds and see with which intra-prediction mode same is, according to the high level syntax in the data stream, associated with for sake of padding. The above-listed parameters can be included in more than one high-level syntax structures. For example, global parameters specified in the SPS can be overridden by parameters specified in the PPS.

For the embodiments of the present application, it is useful whenever the referenced pixel area lies in part or in whole outside the reference frame area. As a precondition, the referenced pixel area is divided into the area outside of the reference frame area and the area inside the reference frame area as explained above. All pixels inside the reference frame area are used directly as input pixels for the motion compensated prediction of the current predicted block. All pixels outside the reference frame area are predicted with the help of an intra-prediction from the adjacent border pixels of the reference frame as explained above.

Using other words, the following steps describe again exemplarily as to how the advantageous intra prediction angle or advantageous intra-prediction mode to be used for passing could be selected among the plurality of available intra prediction angles in encoder and decoder. The selection process may be performed for each block to be predicted and each associated motion vector only once for the luminance (Y) color plane. For the chrominance color planes (Cb and Cr) the same intra prediction angle may then be chosen as for the luminance color planes:

Determine position of referenced area 100: Compute referenced area 100 by adding the motion vector associated with the current block to the area of the current block (e.g. move the current block position by the associated motion vector). Please note that the motion vector can have a fractional part. Therefore round down the motion vector to the nearest integer part. Add motion vector to current block position. Increase referenced area 100 by one sample into each direction. That is, area 100 might be one sample larger in all directions (left, right, top, bottom) than the inter-predicted block for which MMBP is done.

Determine advantageous IntraBP side: If referenced area 100 overlaps reference frame 101 at one side only use this side, else referenced area 100 overlaps reference frame 101 at two sides (see FIG. 5). Then use default perpendicular padding for the side which overlaps the reference frame by less sample lines. Use IntraBP padding for the remaining side.

Determine bottom and top line: Bottom line is the first sample line of the referenced area 100 outside the reference frame 101 parallel to the advantageous IntraBP side (110 in FIG. 8). Top line is the last sample line of the referenced area outside the reference frame parallel to the advantageous IntraBP side (112 in FIG. 8). That is, the one farthest away from the reference frame's border 106 is chosen.

Constrain plurality of available intra prediction modes: For the top line and each intra prediction mode calculate the relevant/affected border pixels, which have to be used for the intra prediction, by inverting the prediction direction. If the maximum displacement of the border pixels from the perpendicular intra prediction mode is above 1.25*the width of the predicted block, skip/don't use this intra prediction angle. This step is optional. That is, optionally, those angular modes are excluded from the selectable list of modes which lead when back-projecting the outermost line of samples 112 back onto the border samples 110, to the border samples 110 being offset from the perpendicular back-projected footprint of the outmost sample line by more than a predetermined threshold.

Calculate probe area for bottom and top line: For bottom (top) line and each intra prediction mode out of the constrained set of intra prediction modes invert the prediction direction to determine the relevant/affected border pixels 110', which have to be used for the intra prediction. Locate the probe area 104 under the affected border pixels inside the reference frame (104 in FIG. 7). Set probe area height to two samples lines perpendicular to the advantageous IntraBP side.

Calculate similarity measure: Predict sample values of probe area by inverted intra prediction from relevant/affected border pixels. Compute SAD measure between predicted sample values of probe area and reconstructed sample values of reference frame at the location of the probe area. Combine/add SAD measures from bottom and top probe area.

Select advantageous intra prediction angle: Among the set of constrained intra prediction angles select the angle with the smallest similarity measure to be the advantageous intra prediction angle. If intra prediction angles have the same similarity measure the angle which is nearer to the perpendicular prediction angle may be used.

If the selected advantageous intra prediction angle is not equal to the perpendicular intra prediction angle perform IntraBP for each color plane with the above selected intra prediction angle and the above advantageous IntraBP side in encoder and decoder:

Determine position of referenced area: Compute referenced area similar to the description above, but increase referenced area not only by one sample into each direction but instead by half of the size of the interpolation filter taps into each direction.

Fill part of the referenced area which lays inside the reference frame: Fill part of the referenced area which lays inside the reference frame with the sample values of the reference frame.

Optionally fill non-advantageous IntraBP side: If referenced area overlaps reference frame at two sides perform default perpendicular padding for the part of the referenced area which overlaps the reference frame by less sample lines.

Perform IntraBP for advantageous IntraBP side: Use advantageous intra prediction angle to perform intra prediction on the border samples of the advantageous IntraBP side to fill the referenced area 100' which lays outside the reference frame.

Use the referenced area sample values compute as described above for each color plane as input values for the motion compensated prediction of the current block.

In addition, existent application such as 360° video streaming services based on the MPEG OMAF standard heavily relay on spatial video partitioning or segmentation techniques. In such application, spatial video segments are transmitted to the client and jointly decoded in a manner adaptive to the current client viewing direction. Another relevant application that relies on spatial segment of the video plane is the parallelization of encoding and decoding operation, e.g., to facilitate the multi-core and parallelization capabilities of modern computing platforms.

One such spatial segmentation technique is implemented in HEVC and known as tiles which divide the picture plane into segments forming a rectangular grid. The resulting spatial segments are coded independently with respect to entropy coding and intra-prediction. Furthermore, there exists means to indicate that the spatial segments are also coded independently with respect to inter-prediction, which may also be combined with spatial segmentation that is static over pictures. Together, these constraints allow for truly independent coding of spatial segmentation of an exemplary picture plane with two such neighboring and independently coded spatial segments.

Figure 15:
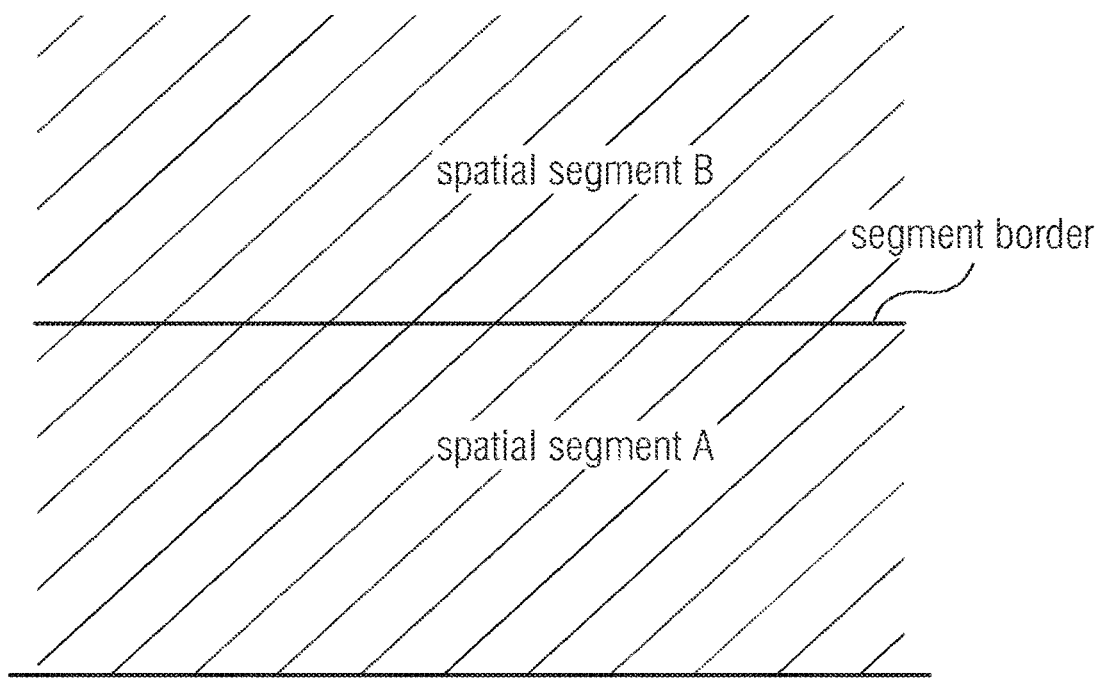
FIG. 15 shows a schematic view illustrating an example of horizontal border between two independent spatial segments in accordance with an embodiment of the present application.
Figure 16:
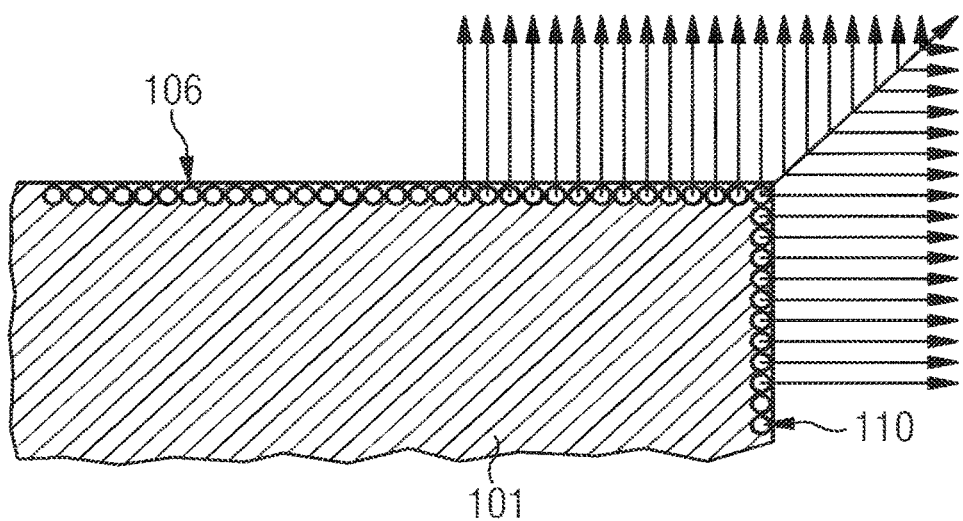
FIG. 16 shows a schematic diagram illustrating the perpendicular prediction to explain the state of the art.
Figure 17:
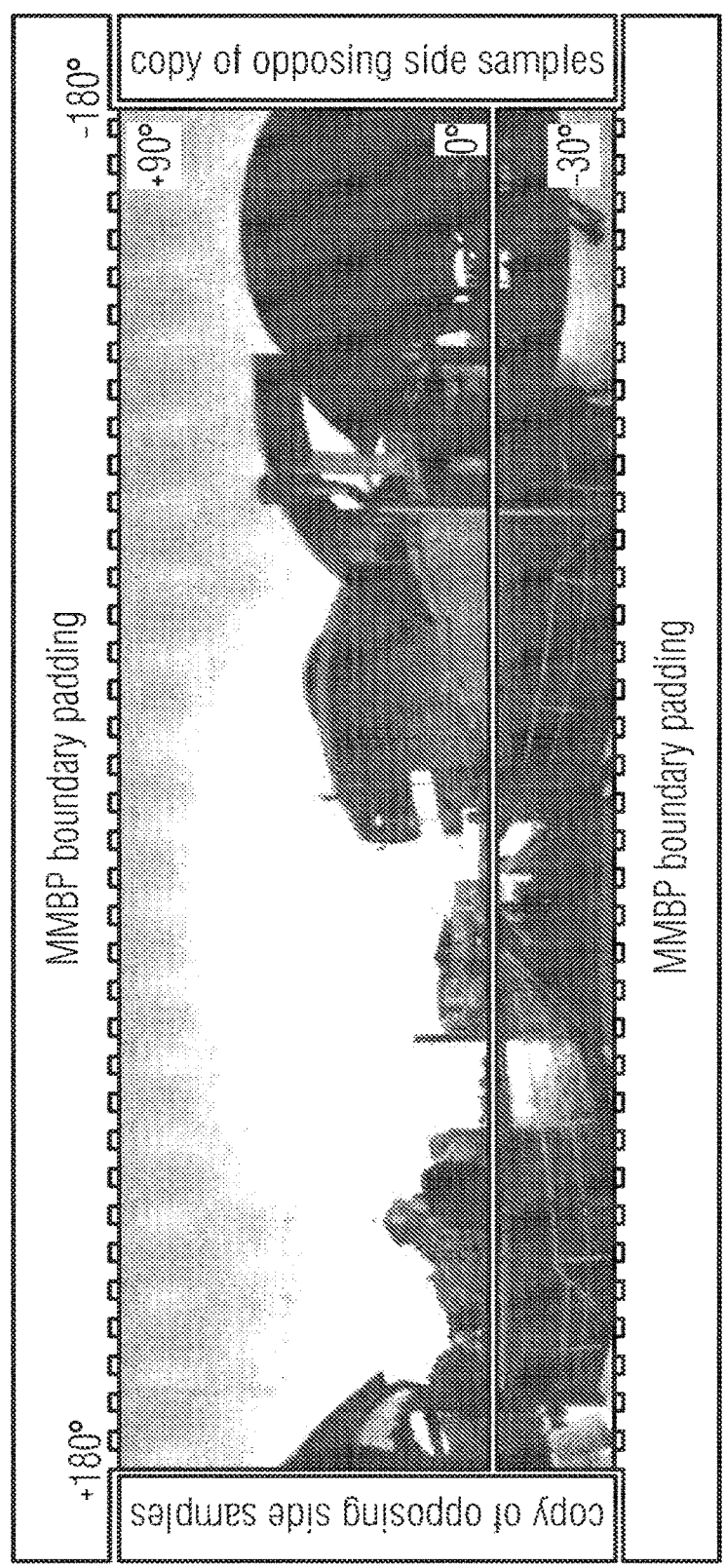
FIG. 17 show a sample image of video frame with 360° horizontal coverage angle and less than 180° vertical coverage angle.

In more detail, when encoding a current picture using the spatial segmentation shown in FIG. 15 facilitating through inter-prediction a reference picture also using the above illustrated spatial segmentation, motion vectors are constrained in a way that avoids cross-spatial segments A is predicted through reference to a sample of the reference picture that is located within spatial segment B and vice versa.

While independent coding of the spatial segments is an enabler for the existent applications as mentioned above, the associated coding constraints can come at significant coding cost. This bitrate overhead stems, for instance, from signaling comparatively larger motion vector differences (MVD) that correct the available motion vector candidates which would otherwise lead to usage of sample locations outside a given spatial segment without the MVD. Further, an increased amount of residual data needs to be signaled to compensate for the degraded inter-prediction predictors. It is therefore very desirable to enhance codec operation at the boundaries of such spatial segments.

One way to mitigate the coding penalty of conventional solutions for such independent spatial segments is to employ a scheme for padding of in-picture boundaries, i.e. segement border lying in the inner of the picture, such as in addition to the outer frame boundaries, similar to, or according to, the MMBP concept described above on the basis of picture boundaries with the slight modifications and extensions described herein or using the high level syntax based padding mode selection which signals which of two or more intra-prediction modes to be used for the spatial segment border or a certain portion of the spatial segment's border such as the vertical ones. That is, instead of the encoder restricting the signaled motion vectors to not refer to referenced portions extending or lying beyond the spatial segment's borders, such portions would be padded at encoder and decoder, and if such referenced portion crosses or lies beyond the predetermined portion of the spatial segment border, then the signaled intra-prediction mode is used for padding. The mitigation of the coding penalty may, generally, also achieved by use of any intra-coding mode, i.e. without multi-mode selection, such as one of the perpendicular, the omnidirectional or an angular intra-prediction mode, thereby resulting in a encoder and decoder for block-based video coding, configured to encode into, and decode from, the data stream for an inter-predicted block a motion vector which references a referenced portion 100 of a reference picture 101 which extends or lies beyond an in-picture segment border of a predetermined spatial segment in the reference picture, within which the inter-predicted block is located, and pad the area 100' of the referenced portion 100 which extends or lies beyond the in-picture segment border, i.e. outside the predetermined spatial segment. The encoder needs not to redirect a motion vector predictor of the motion vector to urge the signaled motion vector to keep within the predetermined spatial segment of the spatial segments the reference picture is partitioned into in a manner at which the pictures of the video including the current picture are constantly partitioned into. The encoder needs not to signal a redirecting motion vector difference for this vector. The motion vector difference signaled may lead to the motion vector referencing portion outside the predetermined sptial segment such as motion vector difference zero. In particular, the encoder may rely on the padding mechanism of the decoder which enforces spatial segment coding independency of spatially offset spatial segments in the current and reference pictures, and the encoder does the same, i.e. performs padding for sake of reconstructing the inter-predicted block to fill the decoded picture buffer.

As a first aspect, high-level syntax elements in bitstream structures as parameter sets, slice headers or others, control application of multi-mode boundary padding on spatial segment boundaries in general. One value of this syntax indicates to a decoder that:
  inter-prediction of the samples of the spatial segment is independent of samples belonging to other spatial segments, and
  sample positions outside the spatial segment boundaries are used in inter-prediction of samples within the spatial segment, and
  values of samples on sample positions outside the spatial segment boundaries are generated using the MMBP procedure on the spatial segment boundaries from the samples belonging to the spatial segment.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. A video encoder comprising at least one processor, the at least one processor configured to:
  perform padding of an area of a referenced portion of a reference picture which extends or lies beyond a border of the reference picture, the referenced portion being referenced by an inter-predicted block of a current picture different than the reference picture, by selecting an intra-prediction mode from a plurality of intra-prediction modes, the plurality including an omnidirectional mode and a perpendicular mode, and padding the area using the selected intra-prediction mode;

signal in a data stream for a predetermined portion of the border of the reference picture whether a first or a second intra-prediction mode out of plurality of intra-prediction modes should be used for padding and select, if the referenced portion extends or lies beyond the predetermined portion, the first intra-prediction mode as the selected intra-prediction mode if the first intra-prediction mode is signaled to be used for padding, and the second intra-prediction mode as the selected intra-prediction mode if the second intra-prediction mode is signaled to be used for padding; and predict the inter-predicted block of the current picture using the referenced portion.

2. The video encoder according to claim 1, wherein the selected intra-prediction mode is signaled in at least one of a picture parameter set and a sequence parameter set.

3. The video encoder according to claim 1, wherein the border is an external picture border or an inner picture border separating portions of different picture content.

4. The video encoder according to claim 1, the at least one processor further configured to:

divide a picture plane of a video, which comprises the current picture and the reference picture, into spatial segments in a manner static over pictures of the video, and code the spatial segments independently with respect to entropy coding and intra-prediction, wherein the border of the reference picture is a segment border of a predetermined spatial segment in the reference picture, within which the inter-predicted block is located.

5. A video decoder comprising at least one processor, the at least one processor configured to:

perform padding of an area of a referenced portion of a reference picture which extends or lies beyond a border of the reference picture, the referenced portion being referenced by an inter-predicted block of a current picture different than the reference picture, by selecting an intra-prediction mode from plurality of intra-prediction modes, the plurality including an omnidirectional mode and a perpendicular mode, and padding the area using the selected intra-prediction mode;

derive from a data stream for a predetermined portion of the border of the reference picture whether a first or a second intra-prediction mode out of plurality of intra-prediction modes should be used for padding and select, if the referenced portion extends or lies beyond the predetermined portion, the first intra-prediction mode as the selected intra-prediction mode if the first intra-prediction mode is signaled to be used for padding, and the second intra-prediction mode as the selected intra-prediction mode if the second intra-prediction mode is signaled to be used for padding; and predict the inter-predicted block of the current picture using the referenced portion.

6. The video decoder according to claim 5, wherein the selected intra-prediction mode is received in at least one of a picture parameter set and a sequence parameter set of a data stream.

7. The video decoder of claim 5, wherein the border is an external picture border or an inner picture border separating portions of different picture content.

8. The video decoder according to claim 5, the at least one processor further configured to:

divide a picture plane of a video, which comprises the current picture and the reference picture, into spatial segments in a manner static over pictures of the video, wherein the spatial segments are independently coded with respect to entropy coding and intra-prediction, wherein the border of the reference picture is a segment border of a predetermined spatial segment in the reference picture, within which the inter-predicted block is located.

9. A method for encoding video, the method comprising:

performing padding of an area of a referenced portion of a reference picture, which extends beyond a border of the reference picture, the referenced portion being referenced by an inter-predicted block of a current picture different that the reference picture, by selecting an intra-prediction mode from a plurality of intra-prediction modes, the plurality including an omnidirectional mode and a perpendicular mode, and padding the area using the selected intra-prediction mode;

signaling in a data stream for a predetermined portion of the border of the reference picture whether a first or a second intra-prediction mode out of plurality of intra-prediction modes should be used for padding and select, if the referenced portion extends or lies beyond the predetermined portion, the first intra-prediction mode as the selected intra-prediction mode if the first intra-prediction mode is signaled to be used for padding, and the second intra-prediction mode as the selected intra-prediction mode if the second intra-prediction mode is signaled to be used for padding; and predicting the inter-predicted block of the current picture using the referenced portion.

10. A method for decoding video, the method comprising:

performing padding of an area of a referenced portion of a reference picture which extends beyond a border of the reference picture, the referenced portion being referenced by an inter-predicted block of a current picture different than the reference picture, by selecting an intra-prediction mode from a plurality of intra-prediction modes, the plurality including an omnidirectional mode and a perpendicular mode, and padding the area using the selected intra-prediction mode;

deriving from a data stream for a predetermined portion of the border of the reference picture whether a first or a second intra-prediction mode out of plurality of intra-prediction modes should be used for padding and select, if the referenced portion extends or lies beyond the predetermined portion, the first intra-prediction mode as the selected intra-prediction mode if the first intra-prediction mode is signaled to be used for padding, and the second intra-prediction mode as the selected intra-prediction mode if the second intra-prediction mode is signaled to be used for padding; and predicting the inter-predicted block of the current picture using the referenced portion.

11. A non-transitory digital storage medium having a computer program stored thereon to perform, when the computer program is run by a computer, a method of video decoding comprising:

performing padding of an area of a referenced portion of a reference picture which extends beyond a border of the reference picture, the referenced portion being referenced by an inter-predicted block of a current picture different than the reference picture, by selecting an intra-prediction mode from a plurality of intra-prediction modes, the plurality including an omnidirectional mode and a perpendicular mode, and padding the area using the selected intra-prediction mode;

deriving from a data stream for a predetermined portion of the border of the reference picture whether a first or a second intra-prediction mode out of plurality of intra-prediction modes should be used for padding and select, if the referenced portion extends or lies beyond the predetermined portion, the first intra-prediction mode as the selected intra-prediction mode if the first intra-prediction mode is signaled to be used for padding, and the second intra-prediction mode as the selected intra-prediction mode if the second intra-prediction mode is signaled to be used for padding; and predicting the inter-predicted block of the current picture using the referenced portion.

* * * * *